Patented Sept. 17, 1963

3,103,858
PRESSURE-SENSITIVE ADHESIVE COMPOSITIONS IN THE FORM OF EMULSIONS AND METHODS FOR THEIR PREPARATION AND USE
Sidney Lauren, Cranford, N.J., assignor to Johns-Manville Corporation, New York, N.Y., a corporation of New York
No Drawing. Filed Jan. 4, 1957, Ser. No. 632,431
18 Claims. (Cl. 94—22)

This invention relates to new adhesive compositions, to methods used in the preparation of these adhesive compositions and to the use of such adhesives. More particularly, it is concerned with (a) adhesives in the form of emulsions of the oil-in-water type which may be readily applied to surfaces by ordinary brushing methods and when so applied will produce tacky, pressure-sensitive adhesive films upon such surfaces, (b) new methods for preparing such emulsion adhesives from rubber-base adhesive batches, and (c) methods of using such adhesives, e.g., for the installation of floor covering tiles or the like.

FIELD OF INVENTION

There are many known liquid adhesive compositions which may be applied to surfaces to obtain pressure-sensitive adhesive films by evaporation of volatile materials from the applied coatings. Such products can be divided into two broad categories, namely, "solvent type" and "emulsion type." The solvent type products are composed of an adhesive base dissolved in some volatile solvent, and the well known rubber cement used for paper gluing is an example of this type of product. Additional examples of adhesive compositions of this type are described in U.S. Patents 2,203,677, 2,601,016, 2,606,884 and 2,643,238.

In general, these known liquid solvent type adhesives are extremely viscous solutions even when the solids content thereof is relatively low and it will be apparent that where it is desired that solutions be of sufficiently low viscosity to render them readily applicable to surfaces by ordinary brushing methods, the proportion of solvent in the solutions is necessarily relatively high. Adhesives containing relatively large proportions of solvent have a number of serious disadvantages, particularly where the contemplated use of such adhesives is in cementing tiles to floors. One of these serious disadvantages arises from the fact that the commercially practical solvents for adhesives of this type are either flammable or toxic or both, and the higher the proportion of solvent, the greater is the problem resulting from these properties. Attempts have been made to reduce the flammability and/or toxicity of the adhesive solutions by reducing the solvent content, but the resulting increase in the percentage of solids increases the already undesirable tendency of such solutions to gel, a condition which makes spreading of the adhesive difficult or impossible.

The flammability and/or toxicity problems encountered with solvent adhesives can, of course, be avoided by use of emulsion-type adhesives which contain water instead of solvent. Such emulsion adhesives have been proposed, for example, in U.S. Patents 1,793,983, 2,235,562, and 2,412,182 and in the technical literature but, particularly where used in cementing tile to floors and walls, these emulsions have exhibited several undesirable characteristics. One such undesirable characteristic is the tendency of such emulsions, when spread upon surfaces such as plywood, to form a layer of moisture between the surface and the resulting adhesive film which prevents the film from adhering adequately to the surface. This moisture-layer forming characteristic is probably related to another inherent disadvantage of emulsion adhesives, namely, the relatively long period required for evaporation of volatiles from such adhesives. Also, most ordinary emulsion adhesives do not develop sufficient tack (cohesive power) to be useful, for example, in cementing tiles to floors and walls and, moreover, exhibit rather poor stability; i.e., the solids tend to coagulate, when the adhesives are stored for the periods required under the usual merchandising systems for such products, particularly where the stored products are subjected either to elevated temperatures, such as about 100° F., or to repeated freezing and thawing. Since coagulation of the solids is the cause of the breaking of emulsions, it is apparent that increasing the cohesive properties of the solids of the emulsion, as by including a tackifying resin, may actually increase the coagulating tendencies and promote instability.

One important aspect of the present invention is the discovery that it is possible to produce emulsions of the oil-in-water type in which the oil phase includes a rubber or rubbery material and a tackifying substance, which emulsions, even though having the required tackiness, are (1) more stable than prior emulsions when subjected to elevated temperatures and to repeated freezing and thawing, (2) more quickly lose their volatile components when spread, than prior emulsions of this type, so as to permit early application of articles to be cemented and (3) tend not to form moisture layers adjacent surfaces such as plywood. These surprising results have been accomplished in the new adhesives of this invention by the simple innovation of mixing with the rubber-tackifier portion of the oil phase a small but substantial amount of a volatile solvent. Dispersing the oil phase solids in such a solvent prior to mixing with the water phase not only accomplishes the above-described advantageous results with adhesives of the rubber-resin type, but also facilitates preparation of any pressure-sensitive adhesive emulsion and makes it possible, with this general class of adhesives, to employ to advantage a further discovery which constitutes a second phase of the present invention.

This further discovery is best understood after consideration of certain additional problems which may be encountered in the use of prior emulsion adhesives. One such additional problem is the tendency for the films produced from such emulsions to become re-emulsified when contacted with water. Of course, this lack of water-resistance is highly undesirable in many applications. Although the re-emulsification problem has, at times, been somewhat mitigated by the use of emulsifying agents which become inactive through the evaporation of a component during the drying of coatings spread from the emulsions, e.g., see U.S. Patents 2,265,364 and 2,349,326, the use of such fugitive emulsifying agents does not seem to have been suggested, or known heretofore in the formation of pressure-sensitive adhesive emulsions. Apparently, due to the great cohesiveness of rubber-base pressure sensitive adhesive masses, and particularly those including a tackifier, it has been considered necessary heretofore, in order to be able to first disperse such rubber-resin mixtures, and then to keep the dispersions stable, to employ non-fugitive emulsifying agents having much stronger emulsifying tendencies than the fugitive type of agents, just mentioned. This is shown, for example, by U.S. Patents 2,382,417 and 2,411,905, which discuss developments of organizations which are very active in the pressure-sensitive adhesive field.

Another additional problem which has limited the usefulness of emulsion adhesives is the corrosive qualities of the prior known emulsions, particularly to ferrous metals, and containers, such as cans and drums, made from ferrous sheet metal. Such corrosive qualities of the emulsions are troublesome for several reasons. First, it causes iron oxide or other materials to be formed which discolor the product. Also, the products of corrosion may have a catalytic effect in causing deterioration of the rubber and other materials employed as the major adhesive components of the products, and they have a tendency to cause the dispersed phase to coagulate, i.e., to break the emulsion. This corrosiveness of the emulsions, moreover, limits very critically the type of containers in which the products can be stored, or the length of time that they may be held on the shelf before being used. Anti-oxidants and other similar agents which should have some effect in reducing the corrosive qualities of emulsion adhesives have in the past been incorporated in such products, e.g., see U.S. 2,382,417, but apparently, prior makers of this type product have not understood fully how to cope with this corrosive problem so as to produce emulsion adhesives having no appreciable corrosive effect on ferrous sheet metal containers, such as unlined tin cans.

The above-mentioned second aspect of the present invention lies in the discovery that pressure-sensitive adhesive emulsions of the oil-in-water type, in which the solid components of the oil phase (with or without a tackifier) are mixed with a volatile solvent, are peculiarly adapted for emulsification with the fugitive, but somewhat weaker, emulsifying agents. The solvent-containing emulsions, emulsified with the fugitive emulsifiers, not only exhibit good water resistance when spread in films, but also, unexpectedly, may not result in corrosion of containers such as ordinary tin cans.

OBJECTS

The specific objects of the present invention include the following:

(1) The provision of adhesive compositions which can be used to produce pressure-sensitive adhesive films upon a wide variety of surfaces, without the need for use of special apparatus or tools, and without requiring the services of a skilled mechanic, i.e., adhesive compositions which may be brushed, trowelled, roller-coated, sprayed or applied in any other standard fashion quite easily by amateurs as well as professional users.

(2) The provision of pressure-sensitive adhesives in the form of oil-in-water emulsions which are compounded so that when they are spread as a film upon a supporting surface, such as by brushing or trowelling, produce a film which froths or bubbles slightly, so that the resulting coating acquires a dimpled surface which is helpful in increasing the degree of contact between the article to be adhered and the pressure-sensitive adhesive layer.

(3) The provision of liquid adhesive compositions which can be applied by means of a brush without any substantial pulling on the brush, which do not have a tendency to form strings or strands when so applied, and do not roll up under a notched trowel when trowelled onto a surface, in contrast to rubber-base, solvent adhesives which are usually stringy when applied, which exert a substantial pull on a brush, and which also can roll up in a troublesome manner under a notched trowel.

(4) The provision of pressure-sensitive adhesives especially suitable for the cementing of floor covering tiles to floors or wall surfaces, but which are equally usable for the cementing of substantially all other types of materials which are not damaged by contact with water to substantially any type of substrate, which likewise is not damaged by contact with water.

(5) The provision of emulsion adhesives which, though containing some flammable organic solvent, possess a relatively non-hazardous flash point of about 60° F. or higher, in contrast to the extremely hazardous flash points of as low as −25° F. for comparable pressure-sensitive adhesive compositions of the solvent type.

(6) The provision of rubber-base adhesive compositions which have a negligible toxicity, i.e. which can be used for laying floor tiles in a closed, unventilated room without accumulation of harmful vapors above the maximum allowable concentration at a point 24 inches above the floor when measured according to Industrial Hygiene Survey methods.

(7) The provision of oil-in-water emulsion adhesives which are substantially non-corrosive to ferrous metals, so that the emulsions can be stored indefinitely in ferrous sheet metal cans having no interior non-metallic protective coating (so-called tin cans, for example) without any appreciable rusting of the ferrous metal on the inside of the cans.

(8) The provision of oil-in-water emulsions of rubber-base pressure-sensitive adhesives which have such a high degree of stability that they may be stored for periods in excess of one year at temperatures which vary from below freezing up to about 110° F., and which may even be subjected to as many as 20 cycles of freezing and thawing without the emulsions breaking, and without adhesive films produced therefrom exhibiting any loss of adhesive properties due to storage under these varying temperature conditions.

(9) The provision of pressure-sensitive adhesive compositions especially useful for installing floor covering tiles, notably the modern types of thin, vinyl-asbestos tiles, because they do not tend to ooze up from the joints between the tiles after installation.

(10) The provision of adhesives which can be used to completely replace known standard types of floor covering tile adhesives, e.g., asphalt-base emulsions or solvent cutbacks, and provide many advantages over these prior known products when used for the installation of floor covering tiles.

(11) The provision of pressure-sensitive adhesives in the form of oil-in-water emulsions, which, when spread in the form of a thin film upon a substrate surface, rapidly break to permit the evaporation of water, leaving a residue which forms a pressure-sensitive film of high adhesive value that rapidly becomes highly water-resistant and non-reemulsifiable.

(12) The provision of pressure-sensitive adhesives particularly tile installation adhesives, which form pressure-sensitive films which are virtually colorless, translucent, and easily cleansable from surfaces accidentally covered or soiled by the adhesive.

(13) The provision of emulsion adhesives which can be used to cement tiles and a wide variety of other articles to many different types of supporting surfaces, including cured concrete, asbestos-cement board, gypsum board, bare or painted plaster, painted metal, bare or painted wood, and even unpainted plywood and hard board, to obtain acceptably strong cementing of the tile or other article to the substrate surface, in contrast to many prior known emulsion adhesives which create unacceptably weak bonds, particularly when used with substrates such as plywood, because of the tendency of such prior known adhesive emulsions to form a disrupting film or concentration of moisture between the substrate surface and the adhesive film.

(14) The provision of adhesive emulsions which include a combination of agents in the aqueous phase that render the emulsions tolerant to substantial concentrations of polyvalent cations, without breaking, thus permitting the emulsions to be diluted with water of substantial hardness.

(15) The provision of oil-in-water emulsions of rubber-base adhesive compositions which exhibit the development of film tack at a satisfactorily rapid rate when the emulsions are applied as a thin layer to a supporting surface.

(16) The provision of methods for taking solvent type rubber-base cements which have gelled and become, therefore, unusable in forming adhesive coatings, and turning such gelled cements into useful pressure-sensitive adhesive compositions.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by forming oil-in-water type emulsions of pressure-sensitive adhesive batches which have (a) an oil phase of dispersed discrete particles, each comprising an adhesive mass containing an elastomeric base mixed with a volatile water-immiscible organic solvent, and (b) a water phase comprising an emulsifying agent, preferably of the type which loses its emulsifying power when a volatile component thereof evaporates. Where extended stability is desired it is advisable to include a protective colloid in the emulsion. Preferably, the adhesive mass which comprises the oil phase, includes rubber as the elastomeric base mixed with a water-insoluble, rubber-tackifying, rubber-compatible resin, a powdered inorganic filler and a rubber antioxidant, and the water phase contains a penetrant plus a fatty acid and an excess quantity of nitrogen-containing volatile base, e.g., morpholine.

The ratio of the oil phase to the water phase, as well as the ratio of various components relative to one another in both phases, may be varied in creating the adhesive compositions of this invention, but it has been found that decidedly superior results can be obtained if these various ratios are maintained within certain limits. It has been discovered that emulsions having the best combination of desired qualities are obtained where the oil phase of the emulsions contains between about 25 to 75% solids by weight and between about 25 and 40% solids in the total emulsion. In terms of the total content of the oil phases and water phases of the new emulsions, it is desirable to have the oil phase constitute between about 40 to 75% of the composition, and the water phase constitute between about 25 and 60% by weight of the composition, with the oil phase composed of dispersed discrete particles having the following composition in parts by weight:

| | |
|---|---|
| Rubber | 100 |
| Tackifying resin | 20–150 |
| Filler | 0–150 |
| Rubber plasticizer | 0–50 |
| Antioxidant | 0–5 | together with sufficient volatile solvent to yield a solution having 25 to 75% solids by weight, while the water phase has the following composition in parts by weight:

| | |
|---|---|
| Water | 100 |
| Emulsifying agent | 1–15 |
| Protective colloid | 0–5 |
| Penetrant | 0–5 |

The most preferable adhesive emulsions of this invention, particularly because of the fact that they possess improved degrees of stability, spreadability, non-corrosiveness and production of films having the highest degree of water-resistance and non-reemulsifiability, have an oil phase which constitutes between about 30 to 60% by weight of the total weight of the emulsion. In these preferred products, the oil phase will consist of dispersed discrete particles having the following composition in parts by weight:

| | |
|---|---|
| Rubber | 100 |
| Tackifying resin | 40–80 |
| Filler | 20–60 |
| Rubber plasticizer | 0–15 |
| Antioxidant | 0.3–3 | together with sufficient volatile water immiscible organic solvent to yield a solution having 25 to 75% solids by weight, and a water phase having the following composition in parts by weight:

| | |
|---|---|
| Water | 100 |
| Emulsifying agent | 5–20 |
| Protective colloid | 1–4 |
| Penetrant | 0.5–2 |

These new emulsion adhesives are produced by a combination of procedural steps which appear to be essential for the successful production of desirable products. Broadly stated, these processes involve first homogeneously mixing a milled batch of elastomeric base, preferably containing a powdered filler, and volatile organic solvent, preferably along with a tackifying agent, to form a homogeneous fluid adhesive mass, blending into the resulting fluid mass a fatty acid or equivalent material which will form the anion portion of an emulsifying agent, then adding thereto with vigorous stirring an aqueous solution of a cation providing material, preferably a volatile nitrogen base in an amount in excess of the amount required to neutralize the fatty acid or other anion providing reagent contained in the rubber base mixture, containing the stirring of the nitrogen base solution and adhesive mass until uniform blending is obtained, and then incorporating in the resulting mass with vigorous stirring, additional water, which preferably will have dissolved therein, a protective colloid, to obtain the final oil-in-water type emulsion. As previously indicated, the best adhesive emulsions comprise a penetrant, and this is introduced into the products most satisfactorily as a component of the aqueous solution which contains the nitrogen base when it is added to the fluid adhesive mass.

Adhesive emulsions composed and produced as outlined above are characterized by the fact that they can quickly and easily be spread or otherwise applied as thin coatings upon supporting surfaces to form tacky, pressure-sensitive adhesive layers which rapidly become highly water-resistant and incapable of being reemulsified by water brought in contact therewith. In addition, these emulsions can be stored for at least one year without the emulsion breaking, even when the emulsion is subjected to repeated freezing and thawing, or when stored for extended periods of time at elevated temperatures as high as 110° F. Further, the emulsions are substantially non-corrosive to ferrous metals, so that they may be stored in unlined tin cans without any rusting of the cans, and they are readily dilutable by water, which can even be water of substantial hardness, because the emulsions possess a high degree of tolerance to polyvalent cations, such as calcium and magnesium ions.

The new emulsion adhesives can be used in a wide variety of ways, but, because of the presence of substantial amounts of water therein, the adhesive should not be applied to surfaces or articles which are damaged by water, unless they are flash-heat sprayed thereon. Since thin layers of the emulsions which are applied to supporting surfaces rapidly break to yield pressure-sensitive adhesive films, even on substrates such as plywood or hardboard, which are inclined to cause detrimental layers or concentrations of water or moisture to form between the substrate and adhesive film, the emulsions are particularly useful for the installation of construction tile, such as floor covering or wall covering tiles. To be used for these purposes, the emulsion adhesive is applied as a thin film to the floor or wall to be covered, the applied film is allowed to remain uncovered until an appreciable portion of the volatile components of the film evaporates therefrom and a tacky coating is formed, after which the construction tiles are placed in contact with the resulting tacky coating and pressed against it with sufficient force to adhere the tile to the supporting surface. When floor tiles are installed using this procedure with the new emulsion adhesives, it is found that there is substantially no tendency for the adhesive to ooze up from the joints between the tiles, even in flooring installations, in contrast to common experience with asphalt-based emulsions or solvent cutback adhesives previously used for this purpose.

*Examples*

The following examples of tested methods and products of the invention are presented in order to enable the reader to obtain a more comprehensive understanding of the new processes and products as generally described above. In these examples, all parts are by weight, unless otherwise specified.

*Example I.*—A rubber batch is prepared by milling together 66.2 parts of smoked sheet rubber, 33.1 parts of precipitated or natural calcium carbonate, and 0.7 part of alkylated polyhydroxy phenol rubber anti-oxidant until the whiting and the anti-oxidant are uniformly distributed throughout the mass of rubber. This combining and milling of the rubber, whiting and anti-oxidant is conducted according to usual rubber-milling practice on a standard rubber mill.

The resulting rubber batch is cut up into small chunks and charged into a cylindrical mixing vessel equipped with a side-entering propeller-type agitator into which there has been previously charged 49.5 parts of the glycerol ester of hydrogenated rosin (M.P. 85° C.), 5.5 parts of polybutene (mol. wt. 10–20,000), 156 parts of rubber naphtha, and 0.7 part of ethanol. These materials are churned together until a homogeneous fluid mass is obtained.

When the adhesive mass is completely uniform, 15.5 parts of red oil are poured into it and the agitation is continued until the mixture again becomes homogeneous. The stirring rate is now increased by speeding up the propeller agitator, and a solution consisting of 15.5 parts of morpholine and 4.7 parts of sodium 2-ethyl hexyl sulfonate dissolved in 50 parts of water are slowly added streamwise into the fluid mixture. The addition of this water solution causes the clear mass to change over into an opaque fluid somewhat resembling very heavy cream. Finally, 7.6 parts of ammonium polyacrylate dissolved in 150 parts of water are slowly run streamwise into the creamy mixture while it is vigorously stirred.

A light tan colored, oil-in-water emulsion with a consistency similar to that of heavy cream and an odor which is mildly ammoniacal is obtained. The viscosity measured with a Stormer viscosimeter fitted with a "P" paddle at 75° F. using a 750 gram weight is from 10 to 35 seconds for 100 revolutions of the paddle. Characteristically a typical example would show an indicated viscosity of 74,000 c.p.s. as measured with a Brookfield viscosimeter at 75° F. using a No. 6 spindle at 4 r.p.m. However, these high consistency values for the emulsion, obtained by these instrumental methods are not reflected in the easy brushability and conspicuous absence of brush drag when the emulsion is brushed onto a surface, e.g., hardboard or plywood.

The resulting emulsion weighs approximately 7.6 pounds per gallon at 80° F. and has a pH of about 8 to 9. It is dilutable with water, and as much as 10 parts of water may be added to one part of emulsion without any appearance of creaming or breaking of the emulsion. It will not mix with organic solvents such as mineral spirits, but when thin films of the emulsion are spread upon a solid surface, the emulsion breaks exceptionally fast, with the result that when the film has been allowed to remain exposed to the atmosphere for as little as ten minutes, the film cannot be washed off with water, and, instead, it is necessary to employ a solvent such as mineral spirits to remove the film. Hence, the films spread from the emulsion rapidly develop good water resistance.

Quantities of an emulsion prepared as described were placed in friction-top, paint cans, and one group of such cans were stored in an oven at 110° F. and another group in a refrigerator which was maintained at a temperature just above freezing. When the emulsions and cans were inspected after two months of such storage, there were no signs of phase separation or other breaking of the emulsion, nor was there any sign of internal corrosion of the cans. Another group of cans containing the emulsion were subjected to ten freeze-thaw cycles, and inspection of the emulsion thereafter showed no signs whatever of phase separation. Furthermore, flooring tile applied with the emulsion which has gone through the ten freeze-thaw cycles, possess the same adhesion to the substrate as similar tile applied to the same substrate using some of the emulsion which has not been frozen.

In order to further test the adhesion qualities of the emulsion, standard 9 x 9 in. vinyl flooring tiles were pressed against a film of the adhesive formed on an asbestos-cement board. The emulsion had been brushed onto the surface of the board and allowed to remain for ten minutes. Although the resulting adhesive film was notably lacking in tack as compared with a similar film applied from a solvent-type product, tiles applied to the film, even when the board was held in a vertical position, showed no slippage whatsoever. After overnight aging at room temperature, attempts to remove the tile revealed a strong "leggy" adhesive film which, in several instances, resulted in breakage of the tile rather than its removal. After aging for one week, the flooring tile cemented to the asbestos-cement was placed under a cold water tap running continuously for eight hours, and inspection of the structure after this water test revealed no impairment of the adhesive bond, despite the soaking and the high alkalinity of the asbestos-cement surface.

To test flammability properties of the emulsion in use, adhesive films were prepared by brushing the emulsion onto asbestos-cement panels which were then placed on the floor of a fire-test room. A torch was inserted through a lower port in the room and held six inches above the test panels immediately after coating. The emulsion flashed in an instantaneous puff only when the torch was directly over the center of a panel and lowered to about 2 to 3 in. above the surface. The flash was instantly self-extinguished. In another series of tests, the torch was inserted three minutes after the panel had been coated. In this series, the emulsion did not flash at all, and, in fact, was not set afire by momentary direct contact of the torch with the film. In contrast, a standard solvent-type adhesive made with the same adhesive base and rubber naphtha produced a flash fire as soon as the torch came within 1 to 2 ft. of the test panel, even after a three minute wait.

*Example II.*—Using a standard type rubber mill, 33.1 parts of smoked rubber sheets are milled at room temperature for a few minutes, and then 33.1 parts of GR–S type 1022 rubber are added to the mill, and the two rubbers are mixed together for about thirty minutes to give suitable breakdown and uniform mixing. Next, 33.1 parts of precipitated or natural calcium carbonate are blended into the rubber mass. When this is completed, 0.7 part of alkylated polyhydroxy phenol rubber anti-oxidant (M.P. 165° C.) are blended into the mass over a period of about five minutes. Thereafter, milling is continued until a sample cut from the mass when tested for plasticity gives a Mooney value at 212° F. of about 60.

The resulting milled rubber batch is divided into chunks on a rubber cutter and is charged into a cylindrical mixing vessel equipped with a side-entering propeller agitator to which there has been previously added while the agitator is operating, first 60 parts of rubber naphtha, and then 38.6 parts of polyterpene resin (M.P. 115° C.) and 11 parts of polyterpene resin (M.P. 85° C.). These ingredients are allowed to churn in the mixer for about three hours, and then an additional 50 parts of rubber naphtha are added in small increments over a period of about five more hours. Next, 5.4 parts of polybutene (mol. wt. 10–20,000) are added and the mass is allowed to churn until a smooth mixture is obtained. Forty more parts of rubber naphtha are now added in increments over a period of about one hour while the mass is vigorously churned, and then sufficient further rubber naphtha (approximately 8 parts) is added with continued agitation until the desired solvent content is attained.

From the resulting fluid adhesive mass, 100 parts are withdrawn and charged into a cylindrical mixing vessel equipped with a high-speed propeller type agitator and the remainder of the fluid mass is transferred to a storage tank to be held for use in making subsequent batches of emulsion. Five parts of red oil are added to the mixer and blended in with the adhesive mass.

In a separate mixer, 5 parts of morpholine and 1.3 parts of sodium 2-ethyl hexyl sulfonate are dissolved in 30 parts of water, and this solution is then added streamwise over a period of about one hour to the blended mixture of red oil and adhesive mass, while the entire contents of the mixing vessel are vigorously stirred. A very heavy, creamy mixture is obtained, and while it is vigorously agitated, a solution of 2.4 parts of ammonium polyacrylate in 20 parts of water are added streamwise thereto over a period of about two hours. Finally, the resulting emulsion is run out of the mixture through a screening machine into storage drums.

The resulting emulsion has a solids content in the oil phase of about 50% solids, and a solids content for the entire emulsion of about 34%. The other properties and characteristics of the emulsion are similar to those indicated above for the adhesive emulsion of Example I.

In the foregoing examples, GRS–1022 rubber is employed as a component of the new adhesives. This is an official government designation for synthetic rubber which is a copolymer of butadiene and styrene containing 23.5% styrene and 76.5% butadiene made with rosin acid emulsifier and a glue acid coagulant to have a Mooney value of 70–85.

DISCUSSION OF VARIOUS DETAILS

The adhesive masses of which the new emulsions of this invention are formed can be made from a wide variety of different basic ingredients. One of the essential components is an elastomeric base which serves to give the adhesive films prepared from the emulsions the desired cohesiveness and at least part of the required tackiness. The elastomeric bases should be water-insoluble, plastic, and inherently tacky or capable of being rendered tacky by admixture with compatible resins. Rubbers are the preferred materials for this purpose, but it is possible to replace rubber in whole or in part by equivalent cohesive synthetic polymers, such as polyisobutylene, polyvinyl ethers and the like.

Rubbers which may be used in forming the new emulsions include wild rubber, smoked sheets, latex crepes, scrap rubber, reclaimed rubber or equivalent synthetic rubbers, such as butyl rubber, olefin/polysulfide plastics, butadiene/acrylonitrile copolymers, butadiene/styrene copolymers, polychloroprene, or similar elastomers. Combinations of synthetic rubbers or synthetic and natural or crude rubbers may be used. The term a "rubber," as used herein, also is intended to include isomerized or halogenated derivatives of the natural or synthetic rubbers just mentioned, i.e., cyclized rubber, or similar heat-treated rubbers, soft chlorinated rubber, soft rubber hydrochlorides, and the like.

In most cases, and particularly with rubbers, it is necessary to employ a tackifying agent in order to obtain films having the desired pressure-sensitive adhesive qualities. Materials of this type are well known and can be referred to broadly as water-insoluble, rubber-tackifying, rubber-compatible resins. Such materials will include the thermoplastic forms of butadiene or other unsaturated hydrocarbon polymers, rosin, rosin esters, hardened rosins, hydrogenated rosins, and derivatives thereof, dehydrogenated rosins and their derivatives, coumarone-indene type resins, and polyterpene resins.

The proportions of rubber or other elastomeric bases, as well as the percentage of tackifying resins which give the most desirable emulsions in accordance with this invention, have been specified above. These percentages are based upon the weight of the ingredient in question relative to the entire oil or water phase. Preferred quantities of components can also be defined in terms of the ratio of a particular component relative to the quantity of rubber or other elastomeric base. Using this method, it has been found that emulsions which possess the best combination of properties for most uses contain 20 to 150 parts of tackifying resin for each 100 parts of rubber.

Rubber plasticizers are not an essential ingredient, but may be used to supplement the tackifying agent. Materials which serve as rubber plasticizers are a known class of materials, usually of low melting point, and include polybutenes of about 10–20,000 m.w., low molecular weight polyterpene resins (M.P. 10°–25° C.), methyl esters of rosin or hydrogenated rosin and the like. Useful emulsions can be made using up to 50 parts of plasticizer per 100 parts of rubber.

Fillers are not an essential ingredient of the new compositions, but it is desirable to include such materials since they serve to strengthen and give body to the adhesive mass. Furthermore, they are generally less expensive than the components of the adhesive mass, and therefore, serve to reduce the cost of the adhesive. A wide variety of materials are available for use as fillers in the new adhesive emulsions, and such rubber fillers or pigments are well known. The examples above illustrate the use of precipitated or natural calcium carbonate, i.e., whiting, for this purpose. Other usable inorganic mineral fillers include talcs, silicas, zinc oxide, powdered slate, and various water-insensitive clays. Carbon black may also be used as a filler where the color it imparts to the adhesive is not undesirable. In terms of the rubber component, the quantity of filler should preferably be between 0 to 150 parts for each 100 parts of rubber.

Another essential ingredient of the oil phase of the emulsions is a volatile organic solvent. Solvents of varied volatility may be employed, but preferably organic liquids having a boiling point between 115° and 275° F. are preferred. Solvents which are recommended include rubber naphtha, hexane, textile spirits, aliphatic naphtha, lactol spirits, and similar organic liquids of comparable volatility and dispersing power for rubber.

Adhesive compositions including a volatile solvent as a component are peculiarly adapted for satisfactory emulsification through the use of the fugitive type of emulsifying agent. Furthermore, the volatile solvent has been found essential for obtaining emulsions which possess necessary spreading properties and the ability to quickly break when spread on a supporting surface to create a pressure-sensitive adhesive film. In terms of the adhesive mass, the amount of volatile solvent in the oil phase should be preferably such as to yield a solution having 25% to 75% solids. Of course, a mixture of solvents can be used if desired.

It is possible to form the fluid adhesive mass which constitutes the oil phase of the new emulsions, simply by charging all of the desired components thereof into a mixing vessel and blending the components together. However, for proper blending and stable emulsification of the fluid adhesive mass, it has been found that the rubber and any filler to be used should first be homogeneously mixed together, such as by milling on a rubber mill, after which this rubber batch, cut up into suitable chunks, is blended into a solution of the tackifying resin in the organic solvent. About 0.1 to 1% of an alkanol such as ethanol, may be included in this mixture as an aid for the solvent in dissolving or dispersing the rubber. In order to obtain satisfactory emulsification of the liquid adhesive mass, it has been found that the viscosity thereof should correspond to a viscosity measured with a Stormer viscosimeter, having a "Q" paddle, using a 1000 gram weight of 25 to 45 seconds per 100 revolutions of the paddle, at 75° F.

An essential ingredient of the water phase of the new emulsions is an emulsifying agent. The manufacture of such agents has become highly developed, and there are a number which are commercially available, made specifically for the production of rubber dispersions. Most of these are of the non-fugitive type, i.e., retain their emulsifying powers even after all of the volatile material in an emulsion has been evaporated. It has been found that this type of agent is less desirable for use in forming the new emulsions, and that instead, emulsifying agents of the "fugitive" type, i.e., emulsifying agents which lose emulsifying power when a volatile component thereof evaporates, are preferably employed, particularly where the contemplated use of the adhesive requires it to be water-resistant. The most satisfactory fugitive emulsifying agents for the new emulsions appear to be those which are composed of a volatile monovalent cation and an organic non-volatile anion. Morpholine is a preferred material for providing the volatile cation, but other usable materials which give water-soluble, volatile monovalent cations include ammonia, alkyl amines, e.g., ethylamine and propylamine, and alkanol amines, e.g., triethanolamine.

For the anion portion of the fugitive emulsifying agents, fatty acids, particularly those having 12 to 18 carbon atoms, e.g., oleic acid, stearic acid, palmitic acid, are preferably used. In terms of the oil phase of the emulsions, best results are obtained when 5 to 15 parts of emulsifying agent are used for each 100 parts of the total weight of material in the oil phase.

Rather than use an emulsifying agent which has been preformed from the volatile cation and non-volatile anion, it is preferable to form the final emulsifying agent in situ during the emulsification procedure. This is best accomplished by adding the fatty acid or other anion-providing material to the adhesive mass, which will eventually constitute the oil phase of the emulsion, while the morpholine or other volatile cation-providing reagent is dissolved in a portion of the water which will form the aqueous phase of the emulsion, and then the water solution is blended into the adhesive mass with suitable agitation.

In forming the emulsifying agents, as just described, it has been discovered that decidedly superior emulsions are obtained if an excess of the cation-providing material is included in the products. Thus, if about 1.3 to 3 times the weight of morpholine, or other volatile nitrogen base, above and beyond that which is required to neutralize the fatty acid or other anion-providing component is included in the emulsions, substantial improvement in the non-corrosive properties, as well as stability, particularly to repeated freeze-thaw cycles, is obtained. Also, it is possible to use a mixture of anion-providing reagents so that mixed emulsifying agents are obtained. This is illustrated in the above examples, in which red oil is employed, this being a mixture of fatty acids which predominate in oleic acid.

Another preferred ingredient of the emulsions which may be found essential where substantial storage life is required, is a protective colloid. This component serves to improve the emulsion stability, particularly the stability towards freezing and thawing. Also, it enables the emulsions to have the ability, when spread as a film upon a supporting surface, to rapidly break and yield the desired water-resistant, pressure-sensitive adhesive film. A protective colloid may also be selected which provides the adhesive film with a desirable initial tack. Water soluble salts of polyacrylic acids, preferably ammonia or other volatile nitrogen compound salts, appear to be highly superior for use as protective colloids in the new emulsions, because they enhance early adhesive qualities of the resulting pressure-sensitive films, and they also appear to have a synergistic effect upon the ultimate adhesive strength.

The term "protective colloid" as used in this specification and the accompanying claims has its recognized meaning when used in discussing emulsions, namely, it means hydrophilic substances that have an apparent molecular weight in excess of about 1000 and also are capable of being dissolved or dispersed in water and which, when incorporated in emulsions, enhance the stability of the emulsions by minimizing any tendencies of the dispersed phase to coagulate, although the substance is not of itself capable of causing the material constituting the dispersed phase to become emulsified. Examples of protective colloids, in addition to the indicated polyacrylate salts, which can be recommended for use in producing the new emulsions of this invention include: hydrophilic cellulose esters and ethers, and the salts thereof, e.g., methyl cellulose and sodium carboxy methyl cellulose; hydrophilic proteins and derivatives, e.g., albumin, casein, gelatin, glue, alkali-solubilized, sequestrant-protected casein; alginates, e.g. sodium alignate; hydrophilic gums, e.g., gum acacia and gum tragacanth; soluble starches and dextrin; and various synthetic hydrophilic polymers, e.g., polyvinyl alcohol and polyacrylamide.

As an example of a commercially available material usable as a protective colloid in the new emulsions, reference is made to "Acrysol G–110," which is approximately a 22% solution in water of an ammonium polyacrylate manufactured by Rohm and Haas Co. of Philadelphia, Pennsylvania.

In addition to an emulsifying agent and protective colloid, it is desirable that the water phase of the new emulsions include a penetrant. This component of the emulsions helps to supplement the emulsifying agent in the emulsification procedure, although it is incapable, by itself, in the concentration used, of producing any emulsification of the adhesive mass. However, its primary purpose is to eliminate the long retention of a moisture layer between the top surface of a substrate and the adhesive film when the emulsion is spread out on the substrate. This function is most noticeable when the emulsions are applied to such materials as plywood or hard board, where emulsions which do not contain a penetrant create unacceptably weak bonds on the plywood or board due to excessive retained dampness at the glue line.

The term "penetrant" as used in this specification and the accompanying claims means lyophobic organic substances having a molecular weight between about 100 to 500 which are soluble in water to an extent of at least about 5% by weight, that markedly reduce the surface tension of water when added thereto, even in amounts as small as 1% or less and which, when dissolved in water, cause it to wet surfaces to which the solution is applied and to spread over the surface at least two times more rapidly than pure water. Such substances, therefore, come within the generic class of materials known as "Surfactants." However, they are distinguished from other specific groups within this generic class, such as emulsifying agents, by having little or no emulsifying ability and a greater ability to promote wetting and spreading than do other species of the generic class of surfactants. The chemical industry now makes and sells a number of materials specifically designed to serve as penetrants as above indicated. The "penetrants," therefore, have now become a recognized class of chemical substances and are referred to as such in standard chemical textbooks, e.g., "The Condensed Chemical Dictionary," 5th edition, 1956, by Reinhold Publishing Corp., page 831. Their use has been largely confined to the textile dyeing industry and, so far as is known, they have never been used in emulsion adhesive of the type described herein. Penetrants which have been found through tests to be particularly effective for use in the preparation of the new emulsion adhesives herein described are the sodium salts of alkyl sulfonates and alkaryl sulfonates which contain alkyl groups containing 6 to 10 carbon atoms, or equivalent monovalent cation salts of such sulfonates. "Tergitol EH," a sodium alkyl sulfonate (principally sodium 2-ethyl hexyl sulfonate), manufactured by Carbide and Carbon Chemical Co., and "Santomerse S," a sodium C–6 alkyl aryl sulfonate manufactured by Monsanto Chemical Co., are examples of specific commercially available penetrants which can be recommended for the practice of this invention.

Standard mixing and rubber milling equipment may be used in producing the new emulsions. Heating of the materials at various stages can be used, but is unnecessary.

CONCLUSIONS

New pressure-sensitive adhesives in the form of oil-in-water emulsions and methods of preparation and use have been described above in detail. The new adhesives possess a number of properties not available in pressure-sensitive adhesives known heretofore. The factors which make these new products possible are not complicated. Now that they have been discovered and explained herein, it will be possible for others to produce these useful products quite easily.

The new adhesives may be used for a wide variety of purposes, but they are especially recommended as replacements for solvent cutback or asphalt emulsion cements used in the construction industry for installing floor or wall tiles. They have the stability to withstand exposure to the extremes of temperatures and handling conditions encountered by products used in the building trades and an ease of application which permits them to be used even by unskilled labor.

What is claimed is:

1. An oil-in-water emulsion adhesive which will produce a tacky, pressure-sensitive adhesive coating upon a surface to which it has been applied when it is allowed to remain on the surface for a period of time sufficient to permit evaporation of a substantial portion of the volatile components thereof, which comprises an oil phase of dispersed discrete particles having the following composition in parts by weight:

| | |
|---|---|
| A rubbery, conjugated diolefin polymer | 100 |
| Tackifying resin | 30–60 |
| Inorganic mineral filler | 15–45 |
| Rubber plasticizer | up to 15 |
| Antioxidant | 0.3–3 | together with sufficient organic liquid having a boiling point between 115° and 275° F. which is capable of dispersing rubber to form a liquid solution thereof to yield a solution having 25 to 75% solids by weight, and a water phase having the following composition in parts by weight:

| | |
|---|---|
| Water | 100 |
| Morpholine soap of a fatty acid | 2–10 |
| Water soluble, monovalent cation salt of polyacrylic acid | 1–4 |
| Morpholine | 0.2–4 |
| Water-soluble, monovalent cation salt of a 6 to 10 carbon atom alkyl sulfonate | 0.5–2 | said oil phase constituting between about 45 to 70% and the water phase between about 30 to 55% of the emulsion adhesive, said percentages being parts by weight.

2. A stable oil-in-water emulsion adhesive which will produce a tacky, pressure-sensitive adhesive coating upon a surface to which it has been applied when it is allowed to remain on the surface for a period of time sufficient to permit evaporation of a substantial portion of the volatile components thereof which comprises (1) an oil phase of dispersed discrete particles, each particle comprising an adhesive mass containing a rubbery, conjugated diolefin polymer and a tackifying resin mxed with an organic liquid having a boiling point between 115° and 275° F. which is capable of dispersing said polymer and said tackifying resin to form a liquid dispersion thereof, (2) a water phase and an (3) interphase consisting essentially of an emulsifying agent, said agent being capable in and of itself emulsifying the first phase.

3. The process of installing floor-covering tiles on a surface which comprises applying a thin film of an emulsion adhesive as defined in claim 2 to said surface, permitting the applied film to remain uncovered for sufficient time for an appreciable portion of the volatile components of the film to evaporate therefrom and produce a tacky coating, thereafter placing floor-covering tiles upon the resulting adhesive film coating and then pressing the tiles against the film.

4. A process for the production of oil-in-water emulsion adhesives which may be stored in ferrous sheet metal cans lacking an interior non-metallic protective coating for periods up to a year or more without breaking, even when subjected to elevated temperatures and to repeated freezing and thawing, and without causing the cans to corrode, said emulsion adhesives being capable of quickly forming tacky, pressure-sensitive adhesive coatings upon surfaces to which they are applied as thin films, which comprises homogeneously mixing a milled batch of rubber, powdered filler and rubber antioxidant with an organic liquid having a boiling point between 115° and 275° F. which is capable of dispersing rubber to form a liquid solution thereof and tackifying resin to form a homogeneous fluid adhesive mass, blending into the resulting fluid mass between about 1 to 5% by weight of a fatty acid, then adding thereto with vigorous stirring an aqueous solution of an amount of a volatile amine 1.5–3 times more than the quantity required to neutralize said fatty acid, continuing the stirring until a uniform blending of the solution and adhesive mass is obtained, and then incorporating in the resulting mass with vigorous stirring a water solution of a protective colloid to obtain the final oil-in-water emulsion.

5. A process for the production of oil-in-water emulsion adhesives which may be stored in ferrous sheet metal cans for at least one year without breaking, even when subjected to repeated freezing and thawing and without causing the cans to corrode, said emulsion adhesives being capable of quickly forming tacky, pressure-sensitive adhesive coatings upon surfaces to which they are applied as thin films, which comprises milling rubber together with about ⅙ to equal parts by weight of a powdered inorganic mineral filler and a small amount of rubber antioxidant until a uniform rubbery batch is obtained, mixing the batch with about ⅕ to equal parts of tackifying resin and about equal to 3.5 parts by weight of an organic liquid having a boiling point between 115° and 275° F. which is capable of dispersing rubber to form a liquid solution thereof with vigorous agitation to form a homogeneous fluid adhesive mass, blending into the resulting fluid mass between about 1 to 5% by weight of a fatty acid, then adding thereto with vigorous stirring an aqueous solution of a slight excess of morpholine over the amount required to neutralize said fatty acid, continuing the stirring until a uniform blending of the morpholine solution and fluid mass is obtained, and then incorporating in the resulting mass with vigorous stirring a water solution of an alkali metal salt of polyacrylic acid containing between about 1 to 3% by weight of said salt, based upon the weight of the resulting mass and sufficient water to make the total water in the resulting oil-in-water emulsion amount to between about 20 to 45% by weight of the emulsion.

6. A stable oil-in-water emulsion of a pressure-sensitive adhesive which comprises an (1) oil phase of dispersed discrete particles, each comprising an adhesive mass containing a rubbery, conjugated diolefin polymer and a tackifying resin mixed with an organic liquid having a boiling point between 115° and 275° F. which is capable of dispersing said polymer and said tackifying resin to form a liquid dispersion thereof, (2) a water phase and (3) an interphase consisting essentially of an emulsifying agent comprising a reaction product of an amine.

7. A stable oil-in-water emulsion which will produce a tacky, pressure-sensitive adhesive coating upon a surface to which it has been applied when it is allowed to remain on the surface for a period of time sufficient to permit evaporation of a substantial portion of the volatile components thereof which comprises (1) an oil phase of dispersed discrete particles, each comprising an adhesive mass containing a rubbery, conjugated diolefin polymer and a tackifying resin mixed with an organic liquid having a boiling point between 115° and 275° F. which is capable of dispersing said polymer and a tackifying resin to form a liquid thereof, (2) a water phase comprising a protective colloid and (3) an interphase consisting essentially of an emulsifying agent comprising a reaction product of an amine.

8. An oil-in-water emulsion adhesive which will produce a tacky, pressure-sensitive adhesive coating upon a surface to which it has been applied when it is allowed to remain on the surface for a period of time sufficient to permit evaporation of a substantial portion of the volatile components thereof which comprises (1) an oil phase of dispersed discrete particles, each comprising an adhesive mass containing a rubbery, conjugated diolefin polymer and a tackifying resin mixed with an organic liquid having a boiling point between 115° and 275° F. which is capable of dispersing said adhesive mass to form a liquid dispersion thereof, (2) a water phase containing a protective colloid and (3) an interphase consisting essentially of an emulsifying agent comprising a reaction product of an amine.

9. A stable adhesive composition for use in setting floor tile and the like, that will quickly form a tacky, pressure-sensitive adhesive coating upon a surface to which the composition is applied as a thin film, which comprises an oil-in-water emulsion having (1) an oil phase of dispersed discrete particles comprising a mixture of a rubbery, conjugated diolefin polymer, a tackifying resin and an organic liquid having a boiling point between 115° and 275° F. which is capable of dispersing said polymer and said tackifying resin to form a liquid dispersion thereof, (2) a water phase and (3) an interphase consisting essentially of an emulsifying agent which is a reaction product of an amine and an organic fatty acid having about 12 to 18 carbon atoms, said reaction product containing an excess of the amine over the amount required to neutralize said acid, said adhesive emulsion being stable under circumstances simulating storage for periods of up to a year or more under conditions involving subjection of the emulsion to elevated temperatures and also to repeated freezing and thawing, the adhesive emulsion being further substantially non-corrosive to ferrous sheet metal containers, and being capable of performing effectively to adhere floor tiles even to troublesome substrates including concrete and plywood.

10. An adhesive composition as claimed in claim 9 wherein the emulsifying agent is an in situ reaction product.

11. An adhesive composition as claimed in claim 9 wherein the dispersed discrete particles are non-saponifying.

12. A stable emulsified, pressure-sensitive adhesive composition which comprises a mixture of a rubbery, conjugated diolefin polymer, a tackifying resin, and an organic liquid having a boiling point between 115° and 275° F. which is capable of dispersing said polymer and said tackifying resin to form a liquid dispersion thereof, said mixture being dispersed in an aqueous medium containing a protective colloid, said composition additionally possessing an interphase between said mixture and said aqueous medium consisting essentially of an emulsifying agent capable in and of itself of emulsifying said mixture comprising a reaction product of an amine, said composition being characterized by the fact that it quickly forms a tacky, pressure-sensitive adhesive coating upon a surface to which it is applied as a thin film, by being stable for periods of up to a year or more under conditions involving subjection to elevated temperatures and repeated freezing and thawing and by being substantially non-corrosive to ferrous sheet metal containers.

13. A stable oil-in-water emulsion adhesive which will produce a tacky, pressure-sensitive adhesive coating upon a surface to which it has been applied when it is allowed to remain on the surface for a period of time sufficient to permit evaporation of a substantial portion of the volatile components thereof, which comprises an oil phase of discrete particles which each comprise a mixture of a rubbery, conjugated diolefin polymer, a tackifying resin and an organic liquid having a boiling point between 115° and 275° F., a water phase and an interphase consisting essentially of an amine soap and a water-soluble, monovalent cation salt of polyacrylic acid.

14. A stable pressure-sensitive adhesive emulsion composition which comprises a mixture of a rubbery, conjugated diolefin polymer, a tackifying resin and an organic liquid having a boiling point between 115° and 275° F. which is capable of dispersing said polymer and said tackifying agent to form a liquid dispersion thereof dispersed as discrete particles in an aqueous medium and an interphase consisting essentially of an emulsifying agent for said mixture comprising a morpholine soap in an amount just about sufficient to emulsify said rubber mixture, an excess of morpholine, said composition being characterized by the fact that it quickly forms a tacky, pressure-sensitive coating upon a surface to which it is applied as a thin film, by being stable under circumstances simulating storage for periods of up to a year or more under conditions involving subjection of the emulsion to elevated temperatures and also to repeated freezing and thawing, and by being substantially non-corrosive to ferrous sheet metal containers.

15. A process for the production of a stable oil-in-water emulsion adhesive which quickly forms tacky, pressure-sensitive coatings upon the surfaces to which it is applied as films, which comprises blending a homogeneous mixture comprising a rubbery, conjugated diolefin polymer, a tackifying resin and an organic liquid having a boiling point between 115° and 275° F. which is capable of dispersing said polymer and said tackifying resin to form a liquid dispersion thereof with a small proportion of a fatty acid, then adding to the blend with vigorous stirring a solution of a volatile amine in water, continuing the stirring until a uniform blending of the water solution and adhesive base has been obtained, to thereby obtain an oil-in-water emulsion which is stable under circumstances simulating storage for periods of up to a year or more under conditions involving subjection of the emulsion to elevated temperatures and also repeated freezing and thawing.

16. A process as claimed in claim 15 wherein the rubbery conjugated diolefin polymer and the tackifying resin are of a non-saponifying nature.

17. A stable oil-in-water emulsion pressure-sensitive adhesive which comprises (1) an oil phase of dispersed discrete particles each comprising an adhesive mass containing a rubbery conjugated diolefin polymer and a tackifying resin mixed with an organic liquid which is capable of dispersing said polymer and said tackifying resin, (2) a water phase, and (3) an interphase consisting essentially of an emulsifying agent, said emulsifying agent in and of itself being capable of emulsifying the oil and water phases.

18. An oil-in-water emulsion adhesive which will produce a tacky, pressure-sensitive adhesive coating upon a surface to which it has been applied when it is allowed to remain on the surface for a period of time sufficient to permit evaporation of a substantial portion of the volatile components thereof which comprises an oil phase of dispersed discrete particles having the following composition in parts by weight:

| | |
|---|---|
| A rubbery, conjugated diolefin polymer | 100 |
| Tackifying resin | 20–150 |
| Powdered inorganic mineral filler | up to 150 |
| Rubber plasticizer | up to 50 |
| Antioxidant | up to 5 | together with sufficient organic liquid having a boiling point between 115 and 275° F. which is capable of dispersing rubber to form a liquid solution thereof to yield a solution having 25 to 75% solids by weight, and a water phase having the following composition in parts by weight:

| | |
|---|---|
| Water | 100 |
| Emulsifying agent | 1–15 |
| Protective colloid | up to 5 |

References Cited in the file of this patent

UNITED STATES PATENTS

| | | |
|---|---|---|
| 2,332,939 | Schmitz et al. | Oct. 26, 1943 |
| 2,368,767 | Moore | Feb. 6, 1945 |
| 2,427,532 | Miskel | Sept. 16, 1947 |
| 2,430,987 | Lindner et al. | Nov. 18, 1947 |
| 2,433,849 | Lathrop et al. | Jan. 6, 1948 |
| 2,443,893 | Collins | June 22, 1948 |
| 2,550,834 | MacDonald et al. | May 1, 1951 |
| 2,637,710 | Hulse | May 5, 1953 |
| 2,682,517 | Asaff | June 29, 1954 |
| 2,684,342 | Eckert | July 20, 1954 |
| 2,782,173 | Bristol et al. | Feb. 19, 1957 |
| 2,799,662 | Ernst et al. | July 16, 1957 |

FOREIGN PATENTS

| | | |
|---|---|---|
| 598,023 | Great Britain | Feb. 9, 1948 |